United States Patent
Schulz (10) Patent No.: US 10,044,167 B2
(45) Date of Patent: Aug. 7, 2018

(54) MONITORING LASER BEAMS

(71) Applicant: TRUMPF Lasersystems for Semiconductor Manufacturing GmbH, Ditzingen (DE)

(72) Inventor: Joachim Schulz, Gerlingen (DE)

(73) Assignee: TRUMPF Lasersystems for Semiconductor Manufacturing GmbH, Ditzingen (DE)

( * ) Notice: Subject to any disclaimer, the term of this patent is extended or adjusted under 35 U.S.C. 154(b) by 0 days.

(21) Appl. No.: 15/367,904

(22) Filed: Dec. 2, 2016

(65) Prior Publication Data

US 2017/0085054 A1 Mar. 23, 2017

Related U.S. Application Data

(63) Continuation of application No. PCT/EP2014/061816, filed on Jun. 6, 2014.

(51) Int. Cl.
*H01S 3/13* (2006.01)
*H05G 2/00* (2006.01)
(Continued)

(52) U.S. Cl.
CPC .......... *H01S 3/1305* (2013.01); *H01S 3/0071* (2013.01); *H01S 3/2232* (2013.01); *H01S 3/2366* (2013.01); *H05G 2/008* (2013.01)

(58) Field of Classification Search
USPC ................................................ 250/504 R
See application file for complete search history.

(56) References Cited

U.S. PATENT DOCUMENTS 4,952,055 A * 8/1990 Wyatt ............... G01N 21/4133
356/128
5,040,872 A * 8/1991 Steinle .................. G02B 5/285
348/E9.027
(Continued)

FOREIGN PATENT DOCUMENTS

CN         103434149 A     12/2013
DE     102007053632 A1     5/2009
(Continued)

OTHER PUBLICATIONS

Ax et al., "Low pressure premixed CH4/air flames with forced periodic mixture friction oscillations: experimental approach", Applied Physics B, vol. 94, pp. 705-714, 2009.
(Continued)

*Primary Examiner* — Phillip A Johnston
(74) *Attorney, Agent, or Firm* — Fish & Richardson P.C.

(57) ABSTRACT

A device includes a driver laser arrangement including a beam source for generating a laser beam and an amplifier arrangement for amplifying the laser beam. The device also includes an apparatus for monitoring the laser beam that includes a transmissive optical element having a normal direction oriented at a tilt angle with respect to a beam axis of the laser beam. The apparatus also includes a spatially resolving detector for registering laser radiation reflected backwards by the transmissive optical element. The transmissive optical element has first and second sides that are oriented at a wedge angle with respect to one another and through which the laser beam passes. The first and second sides reflect first and second partial beams of the incident laser beam. The apparatus has an optical filter that prevents one of the reflected first and second partial beams from reaching the detector.

28 Claims, 2 Drawing Sheets

(51) Int. Cl.
*H01S 3/00* (2006.01)
*H01S 3/223* (2006.01)
*H01S 3/23* (2006.01)

(56) References Cited

U.S. PATENT DOCUMENTS

| | | | |
|---|---|---|---|
| 6,700,916 B1* | 3/2004 | Kramer | G03F 7/70025 372/57 |
| 8,283,643 B2* | 10/2012 | Partlo | H05G 2/008 250/365 |
| 8,953,164 B2* | 2/2015 | Mochizuki | G01J 3/462 356/416 |
| 2010/0097602 A1 | 4/2010 | LaFortune et al. | |
| 2010/0127191 A1 | 5/2010 | Partlo et al. | |
| 2014/0042133 A1 | 2/2014 | Weick | |

FOREIGN PATENT DOCUMENTS

| | | |
|---|---|---|
| DE | 102011007176 A1 | 10/2012 |
| WO | WO2010059210 A2 | 5/2010 |

OTHER PUBLICATIONS

Model 7711 User's Manual, The Fizeau Wavelength Meter, Jan. 1, 1999, 47 pages.
Piv, "Pulsed Nd: YAG Laser for Particle Image Velocemetry", User's Manual, Spectra-Physics Lasers, Inc., Aug. 1997, 16 pages.
Oriel Instruments, "Wedged Windows and Substrates", The Book of Photon Tools, Jan. 1, 1999, 2 pages.
Yaney et al., Distributed-feedbak dye laser for picosecond ultraviolet and visible spectroscopy, Review of Scientific Instruments, vol. 71, No. 3, 10 pages, Mar. 2000.
International Search Report from corresponding PCT Application No. PCT/EP2014/061816, dated Feb. 5, 2015, 6 pages.
International Preliminary Report on Patentability and Written Opinion on the International Searching Authority for corresponding PCT Application No. PCT/EP2014/061816, dated Dec. 6, 2016, 12 pages.

* cited by examiner

MONITORING LASER BEAMS

CROSS-REFERENCE TO RELATED APPLICATIONS

This application is a continuation and claims priority under 35 U.S.C. § 120 to PCT Application No. PCT/EP2014/061816, filed on Jun. 6, 2014. The contents of this priority application is incorporated herein by reference in its entirety.

TECHNICAL FIELD

The present disclosure relates to devices have a driver laser arrangement including a beam source for generating a laser beam and an amplifier arrangement for amplifying the laser beam, and an apparatus for monitoring the laser beam. The apparatus for monitoring the laser beam includes an optical element (e.g., a planar plate) that transmits the laser beam and a spatially resolving detector for registering laser radiation reflected back at the optical element. A normal direction of the optical element is oriented at a tilt angle with respect to a beam axis of the laser beam. The disclosure also relates to an associated method for monitoring a laser beam.

BACKGROUND

In some embodiments of EUV light sources, a monitoring laser beam for testing an alignment of optical components is reflected at a planar plate aligned at an angle to the monitoring laser beam and registered by a detector. The wavelength of the monitoring laser beam differs from the wavelength of a further laser beam (e.g., a $CO_2$ laser beam) that is transmitted by the planar plate, which forms a window in a vacuum chamber.

A small portion of radiation power incident on the planar plate (e.g., which has a tilt) that has been introduced into a beam path is typically reflected to a location outside of the beam path, even in the case of a laser beam that is transmitted by the planar plate. For example, the laser radiation is not only reflected back from one side of the planar plate, but rather, each side of the planar plate reflects a partial beam of the incident laser beam. It has been found that interference strips emerge in recorded images when monitoring or analyzing a laser beam by observing the laser radiation reflected at a transmissive optical element on a spatially resolving detector (e.g., a camera), and so only a few details of a beam cross section of the laser beam to be monitored and imaged on the detector may still be identifiable.

The difference between the degrees of reflection of the two sides of the planar plate can be increased by a reflecting coating applied to one of the sides in order to avoid such interference strips. However, the reflectivity of such a coating should not be selected to be too high, particularly in the case of laser beams with a high laser power (e.g., of multiple kilowatts), such as laser beams generated by a driver laser arrangement. Moreover, a partial beam reflected at one of the two sides, the power of which only has a few percent of the power of the partial beam reflected at the other side, can already lead to clearly visible interference strips. Alternatively, attempts can be made to remove the interference strips in the recorded images with the aid of numerical image processing algorithms, but this technique generally does not adequately remove the interference strips.

In some embodiments, a device for focusing a laser beam on a workpiece includes a transmissive optical element in the form of a planar plate that is arranged at a tilt angle in relation to a beam axis of the laser beam in a convergent beam path of the laser beam and includes a spatially resolving detector for registering laser radiation reflected back at the transmissive optical element. Assigned to the detector are means for distinguishing laser radiation reflected back at a first side of the optical element from laser radiation reflected back at a second side of the optical element. The means can be an image evaluation apparatus or a diaphragm that masks the laser radiation reflected back from one of the sides of the transmissive optical element. Methods for monitoring laser processing may be associated with such a device.

In certain embodiments, methods exist for coaxial beam analysis at optical systems in which a defined percentage of a beam is reflected back coaxially or at a small angle at an optical face that is perpendicular to a chief ray. The partial beam reflected back is separated from the chief ray by a beam splitter, where the partial beam is available for beam analysis. An optical element with a back-reflecting surface can have a wedge angle in order to be able to separate the reflection of the two surfaces on the image side.

SUMMARY

The embodiments disclosed herein include devices of the type set forth at the outset and methods for monitoring a laser beam without the occurrence of spurious interference strips.

In some embodiments, a device includes an optical element that has a first side and a second side that are aligned in relation to one another at a wedge angle and through which the laser beam passes. The first side of the optical element reflects a first partial beam of an incident laser beam, and the second side of the optical element reflects a second partial beam of the incident laser beam. The apparatus has an optical filter that prevents one of the two reflected partial beams from reaching a detector.

The optical element is typically arranged in a collimated beam path of the laser beam. As a result of the generally very small wedge angle between the first side (e.g., through which the laser beam enters the optical element) and the second side (e.g., through which the laser beam emerges from the optical element), the two partial beams are reflected in slightly different directions such that the two partial beams can be separated from one another by an optical filter. For example, optical filtering can be implemented in a plane in which the different angles or the different directions of the laser beams (e.g., which are generated in the plane of the optical element) are converted into a spatial distribution. That is, optical filtering can be implemented in the Fourier space.

Typically, the plane in which the transmissive optical element is arranged (e.g., the object plane) is imaged on an image plane of the detector (e.g., a CCD chip) by an imaging optical unit. In this case, optical filtering can be undertaken in the imaging optical unit. The tilt angle at which the normal direction of the transmitting optical element is aligned in relation to the beam axis of the laser beam (and which corresponds to the angle of incidence of the laser beam on the optical element) is large enough to decouple the reflected partial beams out of the beam path of the laser beam and is typically more than 10°, (e.g., approximately 20°). The incident laser beam and the two reflected partial beams form a common plane in which the tilt angle extends. The wedge angle of the optical element typically does not extend in the plane of the tilt angle.

In some embodiments, the wedge angle is less than 10 mrad (e.g., less than 5 mrad). The transmissive optical element should have the smallest possible influence on the transmitted laser beam. This is the case for a plate that is completely planar (i.e., without a wedge angle) since such a plate does not have refractive power and merely brings about a minimal lateral offset of the laser beam according to a small thickness of the plate. As a result of the wedge angle with values in the range specified above, the laser beam only experiences a negligibly small deflection when passing through the optical element. When desired, such deflection can be taken into account without problems when aligning subsequent optical elements in the beam path.

The optical filter advantageously has a focusing apparatus for focusing the reflected partial beams and a separation element for separating the two partial beams. The separation element is arranged in the region of a focal plane or in the focal plane of the focusing apparatus. As a result of the comparatively small wedge angle of the optical element, there is only a minimal deviation between the directions of reflection of the reflected partial beams. For example, the reflected partial beams separate very slowly from one another and remain spatially superposed over a long distance. The two laser beams incident on the focusing apparatus with different angles of incidence are focused at different locations in the focal plane of the focusing apparatus. The two partial beams can be separated from one another rather easily in the focal plane by deflecting one of the two partial beams with a mirror acting as a separation element such that the deflected partial beam is not incident on the detector. Downstream of the focal plane, the partial beam passed to the detector becomes larger again and generates an image of the laser beam without interference strips on the detector.

In some embodiments, the separation element is embodied as a diaphragm that blocks one of the two partial beams. Via a diaphragm arranged in the focal plane or in the vicinity of the focal plane, it is possible to separate the two partial beams by blocking one of the two partial beams. The diaphragm can be a pinhole diaphragm, a slot diaphragm, or a one-sided diaphragm (e.g., a diaphragm that is only arranged on one side of the reflected partial beam).

In some embodiments, the focusing apparatus is a converging lens. The reflected, collimated partial beams are incident on the lens with different angles of incidence and are therefore focused at different locations in the focal plane of the lens. The lens can serve simultaneously as an imaging optical unit for imaging the plane with the transmitting optical element on the image plane in the detector. The lens form should be selected in such a way that the aberrations during imaging are as small as possible. For example, the lens can be a biconvex lens. It has been found to be advantageous if the lens has a comparatively large focal length of more than 50 mm (e.g., more than 100 mm) in order to keep aberrations as small as possible during imaging. The lens can also be a meniscus lens, which should generally have a focal length of approximately 100 mm or more (e.g., approximately 200 mm or more).

In some embodiments, the two foci of the partial beams have a spacing A in the focal plane. The spacing A corresponds to X multiplied by the diameter of the foci in the focal plane, where X>2 (e.g., X>5). The spacing A between the two foci therefore corresponds to at least two times (e.g., at least five times) the diameter of one of the two foci in the focal plane. The spacing A between the two foci is measured between the centers of the two foci. The diameters D of the two foci are typically of the same size in the focal plane.

In some embodiments, the following relationship applies to the wedge angle $\gamma$, the wavelength $\lambda$ of the laser beam, the refractive index n of the transmissive optical element, the beam radius $w_L$ of the laser beam on the lens, the beam quality factor $M^2$ of the laser beam, and a multiple X of the diameter D of the foci in the focal plane: $\gamma > X \lambda/\pi M^2/(n w_L)$. Here, n denotes the real part of the complex refractive index of the material of the transmissive optical element at the wavelength $\lambda$ of the transmitted laser beam. The product $M^2 \lambda/\pi$ is also referred to in the literature as the beam parameter product (BPP). In the paraxial approximation for a large, collimated laser beam, the following applies for the diameter D of the focus in the focal plane of a lens with a focal length f: $D=2f/w_L \lambda/\pi M^2$. The following applies for the separation or the spacing A of the two foci in the focal plane: $A=f 2n\gamma$. The relationship specified above, which is independent of the focal length f of the lens, emerges from the criterion for the separability of the two partial beams, $A > X*D$.

Preferably, X (i.e., a multiple of the diameter of the foci or of one of the foci in the focal plane) and the wedge angle satisfy the following condition: $\gamma > X*0.18$ mrad (corresponding to $\gamma > X*0.6$ arcmin). This condition emerges from the equation above for a wavelength $\lambda$ of the laser beam of 10.6 µm (e.g., a $CO_2$ laser beam), a beam dimension $w_L=8$ mm, $M^2=1$, and n=2.4 as refractive index of the material of the transmissive optical element (e.g., ZnSe).

In some embodiments, a beam splitter apparatus for dividing the radiation intensity of the two partial beams into first and second observation beam paths is arranged upstream of the focal plane or downstream of the focal plane in the beam path of the focused partial beams. For example, in the first observation beam path, one of the two partial beams can be separated or blocked in the focal plane with the aid of the separation element, while the second partial beam reaches the detector, as described above. For example, the second observation beam path can be used to guide the partial beams to a fast power detector (e.g., a pyroelectric power detector). The beam splitter apparatus may advantageously be arranged upstream of the focal plane for observing both the near field and the far field of the laser beam. If the beam splitter apparatus is arranged downstream of the focal plane, the near field of the laser beam is typically observed with both observation beam paths.

In certain embodiments, an imaging optical unit for imaging the focus of a partial beam generated by the focusing apparatus or the foci of both partial beams on the detector or on a further detector is arranged in the second observation beam path. The other partial beam of the second observation beam path can be blocked or separated in the focal plane, like in the first observation beam path, in order to avoid artifacts. However, optical filtering or separating of the two partial beams is not mandatory in this case since two foci or focal points are present, which are imaged and generally do not overlap. If the imaging of the focus (i.e., focal point) or of the foci (i.e., focal points) is implemented by the second observation beam path on one and the same detector, the imaged partial beam(s) of the second observation beam path is/are incident at a different location on the detector than the imaged partial beam of the first observation beam path. In this case, both the far field and the near field of the laser beam are detectable (offset from one another) on one and the same detector. The imaging optical unit can be a lens or a focusing mirror.

In order to detect the shift of the focal position out of the focal plane in the propagation direction of the partial beam and thus optionally to measure changes in the divergence of the laser beam, it is advantageous to image not only the focal plane itself but also planes in the vicinity of the focal plane on the detector. This can be achieved by lengthening or shortening the beam path of the second observation beam path between the imaging optical unit and the focal plane, which can be achieved by displacing deflection mirrors arranged in the second observation beam path. The focal length of the imaging optical unit typically substantially corresponds to the distance between the imaging optical unit and the focal plane of the focusing apparatus.

In some embodiments, the device is advantageously configured to image the partial beam or the partial beams of the second observation beam path through the beam splitter apparatus on the detector or onto a further detector. In this case, the beam splitter apparatus is typically embodied as a transmissive optical element, at the typically parallel sides of which a first portion of the radiation power is reflected and a second portion is transmitted. The transmitted portion of the radiation power can be guided back to the beam splitter apparatus, for example by deflection mirrors, such that said beam splitter apparatus is passed through a second time by the transmitted radiation portion. In this manner, the non-blocked partial beam or the two partial beams of the second observation beam path can be imaged on the detector in a manner substantially parallel to the non-blocked partial beam of the first observation beam path.

In certain embodiments, the beam splitter apparatus has a first side for reflecting both partial beams of the first observation beam path and a second side for reflecting both partial beams of the second observation beam path. In this case, the separation of the two observation beam paths at the beam splitter apparatus can be implemented by arranging the first side and the second side of the beam splitter apparatus at a wedge angle in relation to one another and/or by selecting the distance between the two sides of the beam splitter apparatus to be so large that the partial beams reflected at the respective side have a sufficiently large distance from one another and are spatially separated to such an extent that they can be detected separately from one another on the detector or on a further detector. Typically, different respective separation elements (e.g., different (pinhole) diaphragms) are required for blocking a respective partial beam of the observation beam paths, provided that optical filtering is even implemented in the second observation beam path.

In some embodiments, at least one side of the beam splitter apparatus advantageously has a coating for modifying at least one optical property of both reflected partial beams of the first or of the second observation beam path. The coating(s) evaluate different properties of the laser beam on the detector. For example, the coating(s) can be polarization-selective coatings that modify the polarization direction of the partial beams or possibly only reflect one polarization direction (e.g., the s-polarized radiation portion or the p-polarized radiation portion). The coating(s) can also be wavelength-selective coatings. For example, a wavelength-selective coating can block wavelengths in the region of the fundamental wavelength of the laser beam such that only radiation with wavelengths possibly superposed on the laser beam is reflected at the coating.

In certain embodiments, the device additionally includes a vacuum chamber in which a target material is arrangeable in a target region for generating EUV radiation. The device may also include a beam guiding apparatus for guiding the laser beam from the driver laser apparatus in the direction of the target region. The beam guiding apparatus guides the laser beam to a focusing element or to a focusing arrangement, which serves to focus the laser beam in a target region.

In the target region, provision is made for a target material (e.g., tin) that transitions into a plasma phase when irradiated by the laser beam and emits EUV radiation in the process. The device therefore serves for generating EUV radiation (i.e., the device is embodied as an EUV light source).

Methods are also disclosed for monitoring a laser beam that passes through a first side and a second side of a transmissive optical element (e.g., a planar plate). The second side of the optical element is oriented at a wedge angle with respect to the first side. A normal direction of the optical element is oriented at a tilt angle with respect to the beam axis of the laser beam. The method includes reflecting a first partial beam of the incident laser beam from the first side of the optical element, reflecting a second partial beam of the incident laser beam from the second side of the optical element, blocking one of the two partial beams before it reaches a detector by optical filtering, and recording an image of the laser beam using the detector on which the non-blocked partial beam is incident.

The method can be used for the beam analysis of a laser beam that is generated by a driver laser arrangement, such as that described above. Such a laser beam typically has a high radiation power that may be greater than 10 kW. The optical element can be arranged at the output of the amplifier arrangement of the driver laser arrangement in order to analyze or monitor the amplified laser beam. However, it is also possible to arrange the optical element in the beam path between individual amplifier stages of the amplifier arrangement or at a different location within the radiation guiding apparatus in order to monitor the laser beam. It is understood that two or more transmitting optical elements can also be arranged in the beam path of the laser beam in order to monitor the laser beam in the manner described above.

Further advantages will be apparent from the description and from the drawings. Likewise, the features mentioned above and still to be specified below can respectively be used separately or together in any combination. The shown and described embodiments should not be understood to be an exhaustive listing, but rather have an exemplary character.

DETAILED DESCRIPTION

In the following description of the drawings, identical reference signs are used for equivalent or functionally equivalent components.

Figure 1:
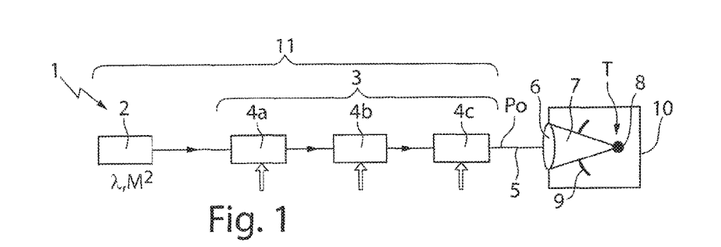
FIG. 1 shows a schematic illustration of a device for generating EUV radiation.

FIG. 1 schematically shows a device 1 for generating extreme ultraviolet (EUV) radiation, which has a beam source 2, an amplifier arrangement 3 with three optical amplifiers or amplifier stages 4a, 4b, 4c, a beam guiding apparatus 5 (depicted without detail), and a focusing lens 6. A laser beam 7 is generated by the beam source 2 and amplified by the amplifier arrangement 3. The focusing lens 6 serves to focus the laser beam 7 onto a target region T at which a target material 8 has been introduced. When irradiated by the laser beam 7, the target material 8 transitions into a plasma phase and emits EUV radiation in the process. The EUV radiation is focused by a collector mirror 9.

In the example shown in FIG. 1, the collector mirror 9 has an opening for passing the laser beam 7. The focusing lens 6 separates a vacuum chamber 10, in which the target material 8 is arranged, from the beam guiding apparatus 5. The beam source 2 has two $CO_2$ lasers in order to generate a pre-pulse and a main pulse, which are together amplified in the amplifier arrangement 3 and focused on the target material 8. Together with the amplifier arrangement 3, the beam source 2 forms a driver laser arrangement 11 of the device 1, which forms an EUV light source.

Figure 2:
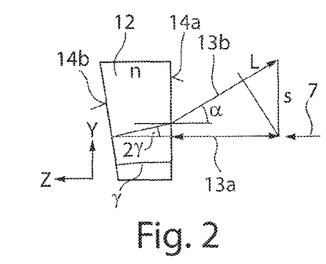
FIG. 2 shows an illustration of a planar plate that has a wedge angle and two partial beams reflected at sides of the planar plate.

A laser power $P_O$ of the laser beam 7 at the output of the amplifier arrangement 3 (e.g., located downstream of the third amplifier stage 4c) is greater than approximately 10 kW. In order to perform a beam analysis on the laser beam 7, it is necessary to decouple a small portion of radiation power from the beam path of the laser beam 7, which portion may be on the order of multiple watts. To this end, a plate-shaped optical element 12 (e.g., a planar plate 12) can be introduced into the beam path of the laser beam 7. The planar plate 12 is embodied as shown in FIG. 2.

The planar plate 12 is formed from material that is transparent to the laser beam 7 at a laser wavelength λ of 10.6 μm. By way of example, the material can be zinc selenide or diamond, which has a refractive index n of approximately 2.4 for the laser wavelength λ. The planar plate 12 has a first side 14a and a second side 14b lying opposite to the first side, through which the laser beam 7 passes (propagating from right to left in the illustration shown in FIG. 2). The first side 14a and the second side 14b are aligned in relation to one another under a wedge angle γ, which is actually very small (e.g., γ<10 mrad, or preferably, <5 mrad), but which is depicted as relatively large in FIG. 2 for clarification purposes. Therefore, the two sides 14a, 14b of the planar plate 12 are aligned almost parallel to one another such that referring to the optical element 12 as a planar plate 12 is accurate, despite the wedge angle γ.

The laser beam 7 passes perpendicularly through the first side 14a of the planar plate 12. A small portion of the radiation power of the laser beam 7 is reflected back (e.g., in a backward direction) as a first partial beam 13a at the first side 14a and propagates backward against the direction of propagation of the laser beam 7. The laser beam 7 emerges at the opposing second side 14b of the planar plate 12, wherein a small part of the radiation power is reflected back into the planar plate 12 as a second partial beam 13b at the second side 14b. The second partial beam 13b propagates in the material of the planar plate 12 at twice the wedge angle 2γ relative to the angle at which the first reflected partial beam 13a propagates.

The second partial beam 13b is refracted when passing through the first side 14a of the planar plate 12 and propagates at an angle α relative to the first partial beam 13a, where $n \sin(2\gamma) = \sin(\alpha)$. Consequently, $\alpha = 2n\gamma$ for small angles γ. For a separation distance s (e.g., a distance between the two partial beams 13a, 13b), the following applies: $s = L/\alpha$, where α denotes the path difference between the two partial beams 13a, 13b. If both partial beams 13a, 13b are incident for beam analysis on a detector 16 (as shown in FIGS. 3A, 3B, and 3C) of an apparatus 15 for monitoring the laser beam 7, interference strips with a spacing which approximately corresponds to the separation s of the partial beams 13a, 13b of FIG. 2 are generated in an image recorded by the detector 16.

In order to enable the decoupling of the partial beams 13a, 13b from the laser beam 7, the normal direction of the planar plate 12 is aligned at a tilt angle β in relation to a beam axis 7a of the laser beam 7. The tilt angle β is approximately 20° in the examples shown, but β can also be larger or smaller. The tilt angle β corresponds to the angle of incidence of the laser beam 7a on the planar plate 12. The illustration of the planar plate 12 in FIG. 2 constitutes a section along the ZY-plane of the apparatus 15 shown in FIGS. 3A, 3B, and 3C. The tilt angle β lies in the plane of the drawing (i.e., the ZX-plane) in which the laser beam 7 and the reflected partial beams 13a, 13b propagate. Consequently, the wedge angle γ and the tilt angle β do not lie in a common plane. As shown in FIG. 2, the wedge angle γ, rather, extends in a plane aligned perpendicular to the plane of the drawing and extends perpendicular to the practically parallel sides 14a, 14b of the planar plate 12. However, an alignment of the wedge angle γ in a plane perpendicular to the plane of the drawing is not mandatory; rather, the plane with the wedge angle γ can have any orientation in relation to the plane with the tilt angle β.

In the apparatus 15, the partial beams 13a, 13b reflected by the planar plate 12 are initially incident on a deflection mirror 17 and subsequently incident on a partially transmissive optical element 18. At the partially transmissive optical element 18, a radiation portion of the partial beams 13a, 13b is deflected to a power detector 19, which measures and monitors the radiation power of the incident radiation portion of the partial beams 13a, 13b.

Figure 3A:
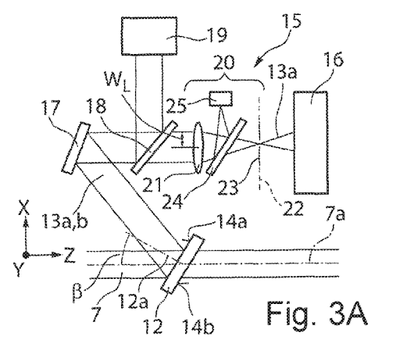
FIGS. 3A, 3B, and 3C show illustrations of apparatuses for monitoring a laser beam, including the planar plate of FIG. 2, a detector, and an optical filter.
Figure 3B:
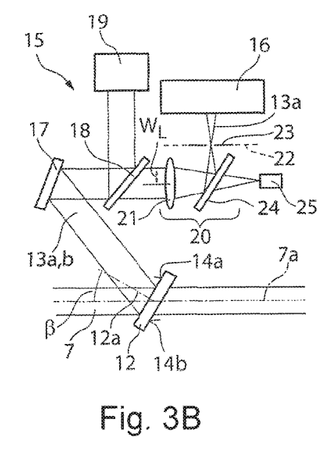
Figure 3C:
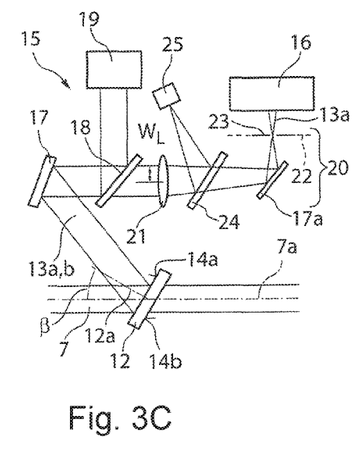

In order to prevent the occurrence of interference strips, the apparatus 15 has an optical filter 20, which, in the examples shown in FIGS. 3A, 3B, and 3C, has a converging lens 21 and a diaphragm 23 arranged in an image-side focal plane 22 of the converging lens 21. The diaphragm 23 is embodied as a pinhole diaphragm in the examples shown, but the diaphragm 23 can also be embodied as a slot diaphragm or as a one-sided diaphragm. The two partial beams 13a, 13b are incident on the converging lens 21 with slightly different alignments and hence angles of incidence (as illustrated in FIG. 2), leading to the two partial beams 13a, 13b being focused at different locations in the focal plane 22 of the converging lens 21. Therefore, the two partial beams 13a, 13b can be separated in the focal plane 22 by blocking of one of the two partial beams 13b, while the other partial beam 13a passes through the diaphragm 23 and is incident on the detector 16.

In the examples shown in FIGS. 3A, 3B, and 3C, a further partially transmissive optical element 24 is arranged in the apparatus 15. The partially transmissive optical element 24 deflects a radiation portion of the two partial beams 13a, 13b onto a pyroelectric detector 25. The apparatuses 15 shown in FIGS. 3A, 3B, 3C substantially differ in that the first partial beam 13a, which is allowed through the diaphragm 23, propagates coaxially with the beam axis 7a of the laser beam 7 in the apparatus 15 shown in FIG. 3A, while the first partial beam 13a is incident on the detector 16 perpendicular to the beam axis 7a of the laser beam 7 in FIGS. 3B and 3C. The apparatuses 15 shown in FIGS. 3B and 3C substantially differ from one another in that the two partial beams 13a, 13b are deflected to the detector 16 at the partially transmissive optical element 24 in the apparatus 15 of FIG. 3B, while the deflection of the two partial beams 13a, 13b to the detector 16 is implemented at a further deflection mirror 17a in the apparatus 15 shown in FIG. 3C.

Figure 4A:
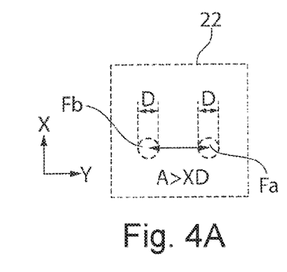
FIGS. 4A, 4B, and 4C show illustrations of foci of the two reflected partial beams in a focal plane of a lens without and with a pinhole diaphragm and a one-sided diaphragm for blocking one of the partial beams.
Figure 4B:
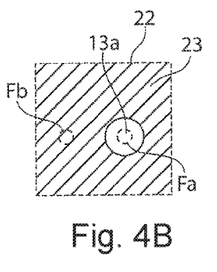
Figure 4C:
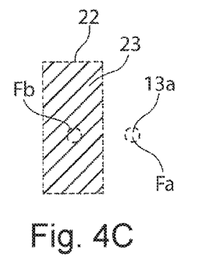

FIGS. 4A, 4B, and 4C show, in an exemplary manner, the focal plane 22 of the apparatus 15 of FIG. 3A, wherein the two circular foci $F_a$, $F_b$ of the two partial beams 13a, 13b with an (identical) diameter D are identifiable in FIG. 4a and are arranged with a spacing A from one another in the Y-direction (i.e., perpendicular to the plane of the drawing of FIG. 3A). FIG. 4B shows the focal plane 22 with the pinhole diaphragm 23, which allows the first partial beam 13a to pass to the detector 16 but blocks the second partial beam 13b. As an alternative to the pinhole diaphragm 23 shown in FIG. 4B, a slot diaphragm 23 or a one-sided diaphragm 23 for blocking the second partial beam 13b can be used, as depicted in FIG. 4C. In order to separate the two partial beams 13a, 13b cleanly from one another, it is advantageous for the two foci $F_a$, $F_b$ to have a spacing A in the focal plane 22 in which A>X*D, where X>2 or preferable >5.

In order to achieve this relationship, the optical filter 20 can be adapted. For example, a radius $w_L$ of the partial beams 13a, 13b incident on the converging lens 21, the wedge angle γ, and the parameters of the laser beam 7 (e.g., the wavelength λ and a beam quality factor $M^2$) can be adapted to one another in a suitable manner, such as where the following condition is satisfied: $γ>X\ λ/π\ M^2/(n\ w_L)$.

For instance, in the present example, the laser beam 7 has a wavelength λ of 10.6 μm, the beam radius $w_L$ of the lens 21 is 8 mm, the laser beam 7 is diffraction limited (i.e., $M^2=1$), and the refractive index n of the material of the planar plate 12 is n=2.4, such that the condition γ>X*0.18 mrad (or γ>X*0.6 arcmin) emerges from the above formula, where X>2 or X>5. Given these parameter values, the partial beams 13a, 13b can generally be separated virtually without problems in the focal plane 22, and so the occurrence of interference strips on the image of the laser beam 7 recorded by the detector 16 can be avoided.

In the examples shown in FIGS. 3A, 3B, and 3C, the converging lens 21 also serves to image the laser beam 7 or the plane with the planar plate 12 on an image plane on the detector 16 (e.g. a pyroelectric detector matrix). In such examples, the converging lens 21 serves as an imaging optical unit. A distance between an object plane in which the planar plate 12 is arranged and the converging lens 21, and the distance between the converging lens 21 and the detector 16 are typically adapted to the focal length f of the converging lens 21 in such a way that the laser beam 7 (e.g., a beam cross section of the laser beam 7) is imaged on the detector 16 with a reduced scale. In order to avoid aberrations, it has been found to be advantageous if the focal length f of the converging lens 21 is comparatively large and lies at approximately f>50 mm (for $w_L$=8 mm) or more. In some embodiments, other lenses (e.g., meniscus lenses or other focusing optical elements, such as focusing mirrors) can be used instead of the converging lens 21.

In addition to analyzing the beam cross section of the laser beam 7 in the manner described above, it is also possible to image or register a far field of the laser beam 7 on the same detector 16 or on a further detector. To this end, the apparatus 15 can be modified in a manner described below with respect to FIGS. 5A, 5B, and 5C. In the apparatus 15 of FIG. 5A, a beam splitter apparatus 27 in the form of a partially transmissive element for dividing radiation intensities of both partial beams 13a, 13b onto first and second observation beam paths 26a, 26b is arranged upstream of the focal plane 23 of the focusing lens 21 in the beam path of the focused partial beams 13a, 13b. The first observation beam path 26a corresponds to the beam path shown in FIG. 3B and serves to image a near field of the laser beam 7 onto the detector 16.

The second observation beam path 26b guides the two partial beams 13a', 13b' via a partially transmissive optical element 24 to a further diaphragm 23', at which the second partial beam 13b' of the second observation beam path 26b is blocked. Unlike what is shown in FIG. 5A, it is also possible to forgo blocking of the second partial beam 13b' since the two partial beams 13a', 13b' of the second observation beam path 26b are separated on the detector 16 even without blocking.

Figure 5A:
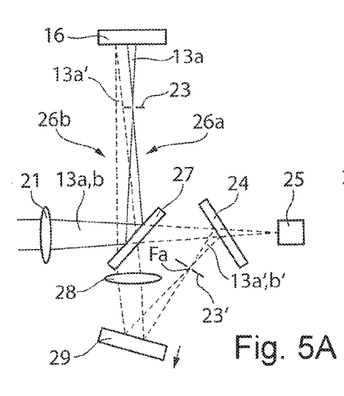
FIGS. 5A, 5B, and 5C show three illustrations an apparatus similar to the apparatuses of FIG. 3B, including a beam splitter apparatus for splitting radiation intensity of the two partial beams in order to image both a near field and a far field of the laser beam on the detector.
Figure 5B:
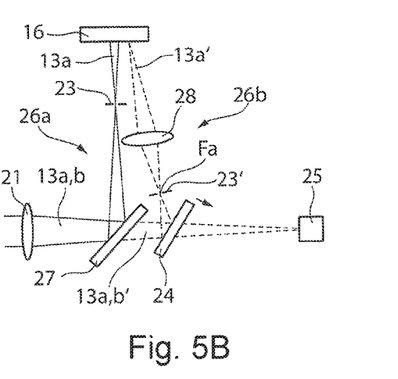

In the example shown in FIG. 5A, the first partial beam 13a' of the second observation beam path 26b is deflected by a further deflection mirror 29 to an imaging optical unit 28 in the form of a further lens, and the focus $F_a$ of the first partial beam 13a' of the second observation beam path 26b is imaged through the beam splitter apparatus 27 on the detector 16 by this further lens 28. Alternatively, imaging of the first partial beam 13a' of the second observation beam path 26b can be implemented past the beam splitter apparatus 27, as depicted in FIG. 5B. In this case, the further deflection mirror 29 of FIG. 5A can be omitted. It is likewise possible to undertake imaging of the first partial beam 13a' past the beam splitter apparatus 27 by virtue of the further deflection mirror 29, together with the lens 28, being displaced further in the direction toward the focusing lens 21 in the apparatus 15, as shown in FIG. 5A. In this case, the imaging of the first partial beam 13a' of the second observation beam path 26b is implemented not downstream, but upstream, of the beam splitter apparatus 27.

Figure 5C:
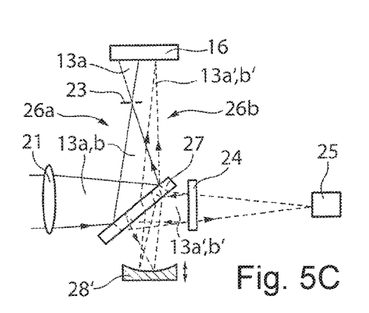

FIG. 5C shows an embodiment of the apparatus 15 in which a focusing mirror 28' serves as an imaging optical unit. The two partial beams 13a', 13b' of the second observation beam path 26b are, in this case, reflected back to the beam splitter apparatus 27 by the partially transmissive optical element 24, which is aligned perpendicular to the direction of propagation of the two partial beams 13a', 13b'. A respective radiation portion of the partial beams 13a', 13b' is deflected or reflected at the front side of the beam splitter element 27 in the direction of the focusing mirror 28'. The partial beams 13a', 13b' of the second observation beam path 26b are reflected back to the focusing mirror 28', focused in the process, and once again, pass through the beam splitter element 27 and are incident on the detector 16. Consequently, the two partial beams 13a', 13b' pass through the beam splitter element 27 a total of three times in the example shown in FIG. 5C. No filtering of one of the two partial beams 13a', 13b' of the second observation beam path 26b was undertaken in the example shown in FIG. 5C, as this is not mandatory. It is understood that the optical filtering in the second observation beam path 26b can be omitted from the apparatuses 15 shown in FIGS. 5A and 5B. As an alternative to the renewed reflection of the two partial beams 13a', 13b' at the beam splitter element 27, as is shown in FIG. 5C, it is also possible to deflect the two partial beams 13a', 13b' onto the focusing mirror 28' by one or more deflection mirrors. The setup of the apparatus 15 shown in FIG. 5C is advantageously compact and easy to manage.

Via the apparatuses 15 shown in FIGS. 5A, 5B, and 5C, it is possible to observe both the near field of the laser beam 7 and the far field thereof on the detector 16, where the image of the near field and the image of the far field are imaged offset from one another on the detector 16. By observing the focus $F_a$ of the first partial beam 13a' (or of both partial beams 13a', 13b') of the second observation beam path 26b, it is possible to monitor the angle distribution (e.g., the divergence) of the laser beam 7 in the plane of the planar plate 12. As indicated by an arrow shown in FIGS. 5A, 5B, and 5C, the beam path between the further lens 28 or the focusing mirror 28' and the focus $F_a$ can be modified by displacing the further deflection mirror 29, the partially transmissive optical element 24, or possibly, other deflection mirrors. In this manner, it is possible to identify a change that may be occurring in the focal position of the imaged partial beam 13a' in the propagation direction (i.e., perpendicular to the focal plane 22) and deduce a change in the divergence of the laser beam 7.

Figure 6:
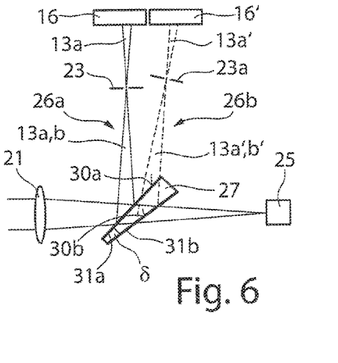
FIG. 6 shows an illustration of an apparatus similar to the apparatus of FIG. 5 with a wedge-shaped beam splitter apparatus that has two polarization-selective coatings.

In an alternative embodiment of the apparatus 15, which is shown in FIG. 6, both the partial beams 13a, b of the first observation beam path 26a and the partial beams 13a', b' of the second observation beam path 26b are reflected at the beam splitter apparatus 27 (e.g., at a first side 30a and at a second side 30b of the beam splitter apparatus 27). The beam splitter apparatus 27 is formed from a material that is transparent to the laser beam 7 and is provided with a reflecting coating 31 at the second side 30b. The first side 30a and the second side 30b of the beam splitter apparatus 27 include a comparatively large wedge angle δ. The wedge angle δ is typically of the order of degrees and is therefore significantly larger than the wedge angle γ such that the two observation beam paths 26a, 26b are reflected at significantly different angles and are incident on two detectors 16, 16' arranged next to one another. Diaphragms 23, 23' are arranged respectively in the first observation beam path 26a and in the second observation beam path 26b in order to mask the respective second partial beam 13b, 13b'. It is understood that the two observation beam paths 26a, 26b can also be incident on a common detector in the apparatus 15 of FIG. 6 and that two detectors can be provided in the apparatus 15 of FIG. 5 in order to separately detect the near field and the far field.

In the apparatus 15 shown in FIG. 6, the reflecting coating 31b of the beam splitter apparatus 27 is embodied as a polarization-selective layer. For example, the reflecting coating 31b only reflects one polarization direction (e.g., s-polarization) of the incident partial beams 13a, 13b. Accordingly, a (reflecting) coating 31a is likewise applied to the first side 30a of the beam splitter apparatus 27 and reflects a polarization direction (e.g., p-polarization) that is orthogonal to the polarization direction reflected by the second coating 31b. In this manner, different polarization directions of the laser beam 7 can be monitored separately from one another on the two detectors 16, 16'. It is understood that one or two coatings 31a, 31b that are selective for other properties of the laser beam 7 can also be applied to the beam splitter apparatus 27. For example, a wavelength-selective coating 31a, b can be applied to one or both sides 30a, b of the beam splitter apparatus 27 in order to suppress specific wavelengths of the laser beam 7. In this way it is possible, to detect wavelengths superposed onto the fundamental wavelength λ of the laser beam 7 separately. In order to separate the two observation beam paths 26a, 26b from one another and as an alternative or in addition to the use of a wedge angle δ, the material of the beam splitter apparatus 27 can have a thickness that is sufficient to spatially separate the two reflected partial beams 13a, 13b of the first observation beam path 26a from the two partial beams 13a', 13b' of the second observation beam path 26b such that these two observation beam paths 26a, 26b can be detected separately.

The parameters of the laser beam 7 established during the beam analysis of the laser beam 7 can be transmitted to an open-loop or closed-loop control apparatus (not shown here), which acts on the driver laser arrangement 11 or on further components (e.g., optical elements in the beam guidance 5 of the laser beam 7) in order to generate a laser beam 7 with parameters optimized for generating the EUV radiation in the target region T.

Unlike what was described in the context of FIGS. 3A, 3B, and 3C, the apparatus 15 can be arranged not only downstream of the third amplifier 4c of the amplifier arrangement 3 but also between two of the optical amplifiers 4a, 4b, 4c, between the first optical amplifier 4a and the beam source 2, or in the beam guiding apparatus 5. In particular, multiple apparatuses 15 described above can be used to monitor the laser beam 7 at different positions on the laser beam path into the target region T. Monitoring of the laser beam 7 can be performed in real time as described above without interference strips occurring in the images of the laser beam 7 recorded by the detector 16.

A number of embodiments have been described. Nevertheless, it will be understood that various modifications may be made without departing from the spirit and scope of the disclosure. Accordingly, other embodiments are within the scope of the following claims.

What is claimed is:

1. A device, comprising:
   a driver laser arrangement comprising:
      a beam source for generating a laser beam, and
      an amplifier arrangement for amplifying the laser beam; and
   an apparatus for monitoring the laser beam, the apparatus comprising:
      a transmissive optical element on which the laser beam is incident, the transmissive optical element having a normal direction oriented at a tilt angle (β) with respect to a beam axis of the laser beam, and
      a spatially resolving detector for registering laser radiation reflected backwards by the transmissive optical element,
   wherein the transmissive optical element has a first side and a second side that are oriented at a wedge angle (γ) with respect to one another and through which the laser beam passes,
   wherein the first side reflects a first partial beam of the laser beam and the second side reflects a second partial beam of the laser beam at a propagation angle (α) with respect to the first partial beam,
   wherein the propagation angle (α) depends on the wedge angle (γ), and
   wherein the apparatus further includes an optical filter that prevents one of the first and second partial beams reflected by the transmissive optical element from reaching the spatially resolving detector based on a separation of the second partial beam from the first partial beam according to the propagation angle (α).

2. The device of claim 1, wherein the transmissive optical element comprises a planar plate.

3. The device of claim 1, wherein the wedge angle (γ) is less than 10 mrad.

4. The device of claim 3, wherein the transmissive optical element has a focusing apparatus for focusing the first and second partial beams reflected from the optical element, and wherein the device further includes a separation element for separating the first and second partial beams arranged in a focal plane of the focusing apparatus.

5. The device of claim 4, wherein the separation element comprises a diaphragm that blocks one of the first and second partial beams.

6. The device of claim 4, wherein the focusing apparatus comprises a lens.

7. The device of claim 4, wherein first and second foci ($F_a$, $F_b$) of the first and second partial beams have a spacing A therebetween in the focal plane that is a multiple (X) of a diameter (D) of one or both of the first and second foci ($F_a$, $F_b$), where X>2.

8. The device of claim 7, wherein X>5.

9. The device of claim 7, wherein $\gamma > X \lambda/\pi\ M^2/(n\ w_L)$, wherein $\lambda$ is a wavelength of the laser beam, n is a refractive index of the transmissive optical element, $w_L$ is a beam radius of the laser beam on the lens, and $M^2$ is a beam quality factor of the laser beam.

10. The device of claim 9, wherein $\gamma > X*0.18$ mrad.

11. The device of claim 4, further including a beam splitter apparatus for dividing radiation intensities of the first and second partial beams into first and second observation beam paths arranged upstream of the focal plane or downstream of the focal plane in the beam path of the first and second partial beams that have been focused.

12. The device of claim 11, further including an imaging optical unit arranged in the second observation beam path for imaging a focus ($F_a$) of a third partial beam generated by the focusing apparatus or foci ($F_a$, $F_b$) of third and fourth partial beams on the detector or on an additional detector.

13. The device of claim 11, wherein the imaging optical unit is configured to image the third partial beam or the third and fourth partial beams of the second observation beam path through the beam splitter apparatus on the detector or on the additional detector.

14. The device of claim 12, wherein the beam splitter apparatus has a first side for reflecting the first and second partial beams of the first observation beam path and a second side for reflecting the third and fourth partial beams of the second observation beam path.

15. The device of claim 14, wherein at least one side of the beam splitter apparatus has a coating for modifying at least one optical property of the first and second partial beams that have been reflected or of the third and fourth partial beams that have been reflected.

16. The device of claim 1, further comprising:
a vacuum chamber in which a target material is arrangeable in a target region (T) for generating EUV radiation; and
a beam guiding apparatus for guiding the laser beam from the driver laser apparatus in a direction of the target region (T).

17. A method for monitoring a laser beam that passes through first and second sides of a transmissive optical element, the second side being oriented at a wedge angle ($\gamma$) with respect to the first side, a normal direction of the transmissive optical element being oriented at a tilt angle ($\beta$) with respect to a beam axis of the laser beam, the method comprising:
reflecting a first partial beam of the laser beam incident on the transmissive optical element from the first side of the transmissive optical element;
reflecting a second partial beam of the laser beam incident on the transmissive optical element from the second side of the transmissive optical element at a propagation angle ($\alpha$) with respect to the first partial beam, the propagation angle ($\alpha$) depending on the wedge angle ($\gamma$);
blocking one of the first and second partial beams before it reaches a detector via optical filtering based on a separation of the second partial beam from the first partial beam according to the propagation angle ($\alpha$); and
recording an image of the laser beam using the detector, wherein only the non-blocked partial beam of the first and second partial beams is incident on the detector.

18. The device of claim 17, wherein the transmissive optical element comprises a planar plate.

19. The device of claim 1, wherein the tilt angle ($\beta$) lies in a first plane and the wedge angle ($\gamma$) lies in a second plane that is different from the first plane.

20. The device of claim 1, further comprising a polarization-selective coating on one or both of the first and second sides of the transmissive optical element.

21. The device of claim 1, further comprising a wavelength-selective coating on one or both of the first and second sides of the transmissive optical element.

22. The method of claim 17, wherein the tilt angle ($\beta$) lies in a first plane and the wedge angle ($\gamma$) lies in a second plane that is different from the first plane.

23. The method of claim 17, wherein a polarization-selective coating is disposed on one or both of the first and second sides of the transmissive optical element.

24. The method of claim 17, wherein a wavelength-selective coating is disposed on one or both of the first and second sides of the transmissive optical element.

25. The device of claim 1, further comprising:
a beam splitter apparatus for dividing radiation intensities of the first and second partial beams into first and second observation beam paths; and
a polarization-selective coating on one or both sides of the beam splitter apparatus.

26. The device of claim 1, further comprising:
a beam splitter apparatus for dividing radiation intensities of the first and second partial beams into first and second observation beam paths; and
a wavelength-selective coating on one or both sides of the beam splitter apparatus.

27. The method of claim 17, further comprising dividing radiation intensities of the first and second partial beams at a beam splitter apparatus into first and second observation beam paths, the beam splitter apparatus comprising a polarization-selective coating on one or both sides of the beam splitter apparatus.

28. The method of claim 17, further comprising dividing radiation intensities of the first and second partial beams at a beam splitter apparatus into first and second observation beam paths, the beam splitter apparatus comprising a wavelength-selective coating on one or both sides of the beam splitter apparatus.

* * * * *

UNITED STATES PATENT AND TRADEMARK OFFICE
CERTIFICATE OF CORRECTION

PATENT NO.         : 10,044,167 B2
APPLICATION NO.    : 15/367904
DATED              : August 7, 2018
INVENTOR(S)        : Joachim Schulz It is certified that error appears in the above-identified patent and that said Letters Patent is hereby corrected as shown below:

In the Claims

Column 14
Line 13, in Claim 18, delete "The device of claim 17," and insert -- The method of claim 17, --

Signed and Sealed this
Sixteenth Day of October, 2018

Andrei Iancu
*Director of the United States Patent and Trademark Office*